US010971028B2

(12) United States Patent
Cheung

(10) Patent No.: US 10,971,028 B2
(45) Date of Patent: Apr. 6, 2021

(54) SYSTEMS AND METHODS FOR MUSIC AND MOVING IMAGE INTERACTION

(71) Applicant: Nam-pink Pandora Cheung, Hong Kong (HK)

(72) Inventor: Nam-pink Pandora Cheung, Hong Kong (HK)

( * ) Notice: Subject to any disclaimer, the term of this patent is extended or adjusted under 35 U.S.C. 154(b) by 0 days.

(21) Appl. No.: 16/362,658

(22) Filed: Mar. 24, 2019

(65) Prior Publication Data
US 2020/0302823 A1 Sep. 24, 2020

(51) Int. Cl.
*G10G 1/02* (2006.01)
*G09B 15/04* (2006.01)
*G09B 15/00* (2006.01)
*G09B 15/02* (2006.01)

(52) U.S. Cl.
CPC ......... *G09B 15/002* (2013.01); *G09B 15/023* (2013.01); *G09B 15/04* (2013.01); *G10G 1/02* (2013.01)

(58) Field of Classification Search
CPC .... G09B 15/002; G09B 15/023; G09B 15/04; G10G 1/02
USPC ........................................................ 84/470 R
See application file for complete search history.

(56) References Cited

U.S. PATENT DOCUMENTS 8,847,053 B2 * 9/2014 Humphrey ............. G09B 15/04
84/609
9,208,763 B2 * 12/2015 Avitabile ............... G10H 1/368

* cited by examiner

*Primary Examiner* — Jianchun Qin

(57) ABSTRACT

The present disclosure relates to music instrument training systems, and more specifically to systems and methods of music playing tools with visual and sound features. In one example of the present disclosure, a music learning system of instructing a first player to play a music playing tool is disclosed. The system includes a first button, when pressed, would play a visual portion archive with the remote computing gadget under a learning mode at regular speed. The system further includes a second button, when pressed, would play the visual portion archive with the remote computing gadget under a practicing mode.

15 Claims, 4 Drawing Sheets

The visual portion at a certain location is shown

The visual portion at a certain location is shown

SYSTEMS AND METHODS FOR MUSIC AND MOVING IMAGE INTERACTION

FIELD OF THE INVENTION

The presently disclosed technology generally relates to music instrument training systems, and more specifically to systems and methods of music playing tools with visual and sound features.

BACKGROUND OF THE DISCLOSED TECHNOLOGY

Learning to play music playing tools or instruments is never easy. In fact, it takes a lot of patience, practice, and hard learning. No matter if one wants to practice violin, piano, guitar, that person must practice constantly and it takes a lot of hard work. The key to learn an music playing tool is develop a practice routine and commit to it. In the past, one learn to musical music playing tools is by taking private lessons. A tutor or teacher can plan and prepare lessons in relation to individual pupils' needs and examination syllabuses, acquire appropriate teaching materials and resources. Most importantly, a music teacher can demonstrate precisely how to play a certain music sequence or portion so that the student can pinpoint a certain weak area during practice. With technologies, however, the learning of musical music playing tools can be more effective. With proper tools in technologies, students can practice and improve more often even without the presence of the teacher. This is the ultimate goal so that it makes more economical for both the teacher and the student in a way that the teacher's teaching time can be best utilized. For example, when a piano student learns to play a particular song, the student needs to observe and monitor how the teacher plays as demonstration. The teacher must be present before the student. Often it is a one way communication because the teacher usually dictates the speed and movement of the fingers in playing the song. The student has very little control in deciding how the teacher can conduct the demonstration. For instance, the student may find difficult or embarrassing to ask the teacher to slow down the finger movements of a particular music sequence. With technologies described in this invention, we hope the student to be able to achieve at will without feeling uneasy or embarrassing to the teacher. The student should be in control in deciding if they want to see the teacher play a certain part of music any time and any where. And the student should also be able to control the pace of the demonstration by the teacher. Additionally, the student can stop the teaching at a particular music playing interval to observe the hand or finger movements of the teacher.

SUMMARY OF THE INVENTION

The present invention describes systems and methods of instructing students to play an music playing tool. In one embodiment, a method is provided. The method can include importing a visual portion archive into a folder of a remote computing gadget, wherein the visual portion archive comprises visual portion of a second player playing the music playing tool and sound portion of the second player playing the music playing tool. As well, the method can include playing the visual portion archive with the remote computing gadget and decreasing a visual speed of the visual portion, wherein while the visual speed of the visual portion has been decreased, the sound portion continues to remain in sound frequency. In some embodiments, the music playing tool is one of a stringed music playing tool, a brass music playing tool, a reed music playing tool, a keyboard music playing tool, and a percussion music playing tool.

The inventive method further includes increasing or decreasing the visual speed of the visual portion, wherein while the visual speed of the visual portion has been increased, the sound portion continues to remain in sound frequency. The method includes magnifying and slow motioning into a selected area of the visual portion, and wherein the selected area is the second player playing the music playing tool. Accordingly, methods can include magnifying away from the selected area of the visual portion.

In addition, the method includes creating a repeating effect of a selected portion of the visual portion and sound portion. Added features include magnifying into a portion of visual portion of the repeating effect and performing at least one of increasing and decreasing a visual speed of the portion of the visual portion of the repeating effect. Some methods can include replaying the repeating effect. The repeating effect can be a first repeating effect, and methods can further include creating a second repeating effect of a second selected portion of the visual portion and sound portion. Accordingly, methods can include magnifying into a portion of visual portion of the second repeating effect and performing at least one of increasing and decreasing a visual speed of the portion of the visual portion of the second repeating effect.

Further, the method further allows creating a third repeating effect of a third selected portion of the visual portion and sound portion, creating a fourth repeating effect of a fourth selected portion of the visual portion and sound portion, creating a fifth repeating effect of a fifth selected portion of the visual portion and sound portion, and creating a sixth repeating effect of a sixth selected portion of the visual portion and sound portion. The methods also includes displaying, via a screen of the remote computing gadget, at least one repeating effect in a timeline that indicates song duration.

This disclosure also includes a self-learn music system that includes a remote computing gadget and a self-learn console communicatively coupled to the remote computing gadget. The self-learn console device can include an outer housing, a first button coupled to the housing, and a second button coupled to the outer housing. In response to the first button being pressed, the remote computing gadget can be configured to play a visual portion archive comprising visual portion of a musician playing an music playing tool and sound portion of the musician playing the music playing tool. In response to the second button being pressed, the remote computing gadget can be configured to decrease a visual speed of the visual portion such that while the visual speed of the visual portion has been decreased, the sound portion continues to remain in sound frequency. In some embodiments, in response to the second button being pressed for a duration of time, the remote computing gadget can be configured to increase the visual speed of the visual portion such that while the visual speed of the visual portion has been increased, the sound portion continues to remain in sound frequency.

In some embodiments, the self-learn console can further include a third button coupled to the outer housing and a fourth button coupled to the outer housing. In response to the third button being pressed, the remote computing gadget can be configured to start a repeating effect of a selected portion of the visual portion and sound portion. In response to the fourth button being pressed, the remote computing gadget can be configured to end a repeating effect of the selected portion of the visual portion and sound portion.

As well, in some embodiments, the self-learn console can further include a fifth button coupled to the outer housing. In response to the fifth button being pressed for a first duration of time, the remote computing gadget can be configured to move from a first repeating effect to a second repeating effect. In response to the fifth button being pressed for a second duration of time, the remote computing gadget can be configured to clear the first repeating effect. Even still, in some embodiments, the self-learn console can further include a sixth button coupled to the outer housing. In response to the sixth button being pressed for a first duration of time, the remote computing gadget can be configured to magnifying into a selected area of the visual portion. The selected area can be the musician playing the music playing tool. In response to the sixth button being pressed for a second duration of time, the remote computing gadget can be configured to magnifying away from the selected area of the visual portion.

Embodiments of the self-learn console can further include a seventh button coupled to the outer housing and an eighth button coupled to the outer housing. In response to the seventh button being pressed, the remote computing gadget can be configured to fast forward the visual portion archive. In response to the eighth button being pressed, the remote computing gadget can be configured to fast rewind the visual portion archive.

The disclosure also includes a self-learn console device that includes an outer housing, a first button coupled to the outer housing, and a second button coupled to the outer housing. In response to the first button being pressed, a remote computing gadget can be configured to play a visual portion archive comprising visual portion of a musician playing an music playing tool and sound portion of the musician playing the music playing tool. In response to the second button being pressed, the remote computing gadget can be configured to decrease a visual speed of the visual portion such that while the visual speed of the visual portion has been decreased, the sound portion continues to remain in sound frequency.

In some embodiments, the device further includes a third button coupled to the outer housing and a fourth button coupled to outer housing. In response to the third button being pressed, the remote computing gadget can be configured to start a repeating effect of a selected portion of the visual portion and sound portion. In response to the fourth button being pressed, the remote computing gadget can be configured to end a repeating effect of the selected portion of the visual portion and sound portion.

As well, in some embodiments, the device can further include a fifth button coupled to the outer housing, a sixth button coupled to the outer housing, a seventh button coupled to the outer housing, and an eighth button coupled to the outer housing. In response to the fifth button being pressed, the remote computing gadget can be configured to move from a first repeating effect to a second repeating effect. In response to the sixth button being pressed, the remote computing gadget can be configured to magnifying into a selected area of the visual portion. In response to the seventh button being pressed, the remote computing gadget can be configured to fast forward the visual portion archive. In response to the eighth button being pressed, the remote computing gadget can be configured to fast rewind the visual portion archive.

The self-learn console can define a first row and a second row. The first row can include the first button, second button, fifth button, and sixth button. The second row can include the third button, fourth button, seventh button, and eighth button. In some embodiments, the fifth button and the sixth button are both located between the first button and the second button, and the third button and the seventh button are both located between the fourth button and the eighth button.

In another embodiment, a music learning system is disclosed. The system allows instructing students to play a music playing tool, which comprises an outer housing and a computing device. The computer device may be a phone, computer, or any computer devices. The outer housing further includes a touch screen. A first button is coupled to the outer housing. A student may press the first button. In response, the computing device is configured to play a visual portion archive with the remote computing gadget under a learning mode at regular speed, the visual portion archive comprising visual portion of a second player playing the music playing tool and sound portion of the second player playing the music playing tool, the first player resembling a student and second player resembling a teacher, wherein decreasing speed at various visual speed of the visual portion, wherein decreasing visual speed at a first location of the visual portion as instructed by the first player, a sound portion at a first location continues to remain in sound frequency; and decreasing visual speed at a second location of the visual portion as instructed by the first player, a sound portion at a second location continues to remain in sound frequency.

In this embodiment, a second button coupled to the outer housing may also be provided. A student may press the second button. In response, the computing device may be configured to play the visual portion archive with the remote computing gadget under a practicing mode. The computer device may include playing the visual portion archive at a first decreased visual speed at the first location of the visual portion without instructed by the first player, the sound portion at the first location continues to remain in sound frequency; playing the visual portion archive at a second decreased visual speed at the second location of the visual portion without instructed by the first player, the sound portion at the first location continues to remain in sound frequency; and playing of the visual portion archive at all locations other than the first and second locations at the regular speed.

Commercial benefits are great for music instrument teachers and students. For students, they can learn from their teachers even during their absence. It would be more convenient for students to learn by observing the teachers' performance style, body movement, posture, etc., at any time and sequence controlled by the student. This improves learning by students and shorten the time to learn or master a music instrument. To the teacher, previously the teacher must physically join the student. This can be time consuming if accounting for the travel time. If the teacher can demonstrate to the student without the presence of the teacher, it saves time and costs of the teacher. More importantly, this now allow the teacher to better utilize the time so that teaching music lessons can now be a scalable business from commercial point of view.

A better understanding of the disclosed technology will be obtained from the following brief description of drawings illustrating exemplary embodiments of the disclosed technology.

DETAILED DESCRIPTION OF EMBODIMENTS OF THE DISCLOSED TECHNOLOGY

Figure 1:
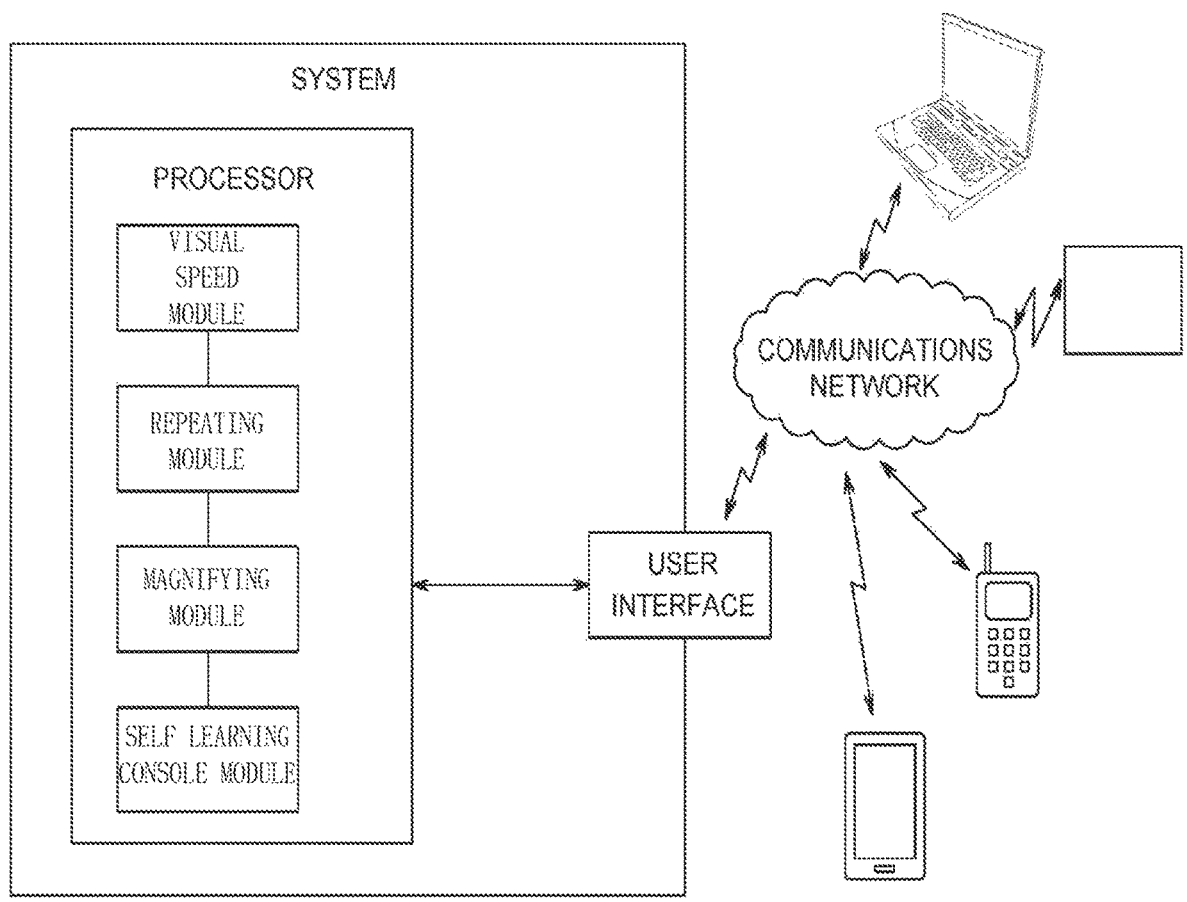
FIG. 1 illustrates a block diagram of the system, according to an embodiment of the present invention.
Figure 2:
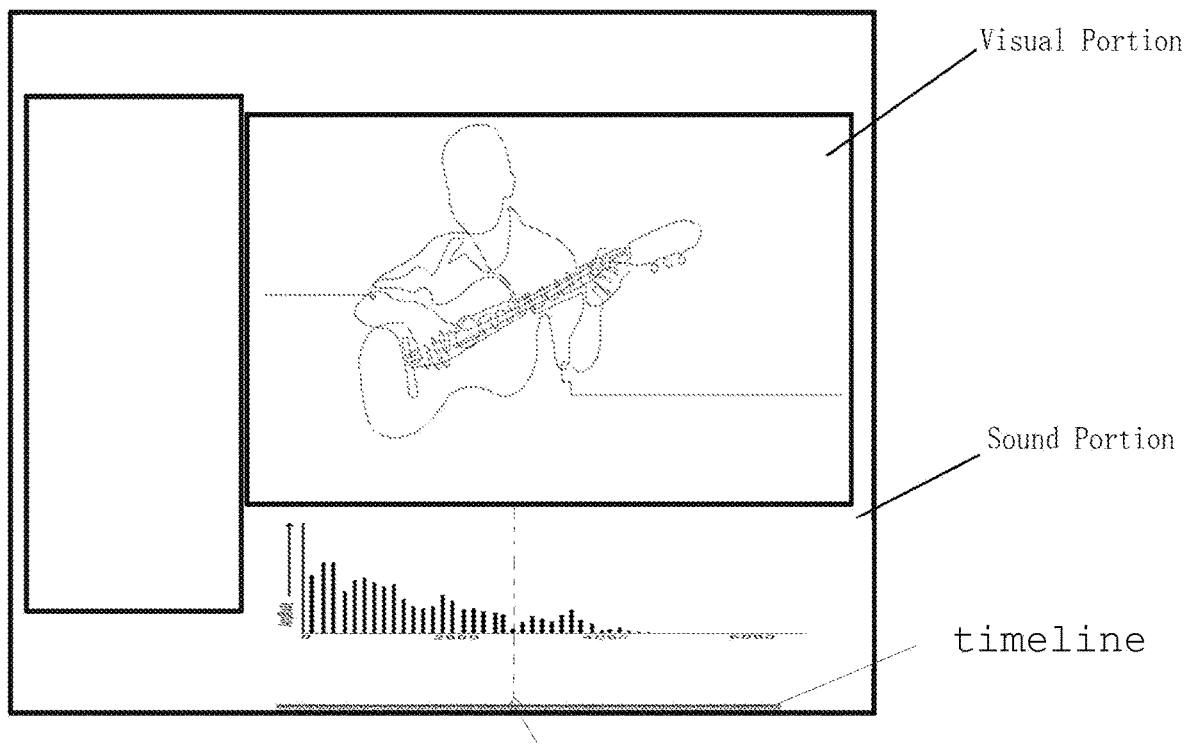
FIG. 2 illustrates an exemplary screen of a music learning system, according to an embodiment of the present invention.
Figure 3:
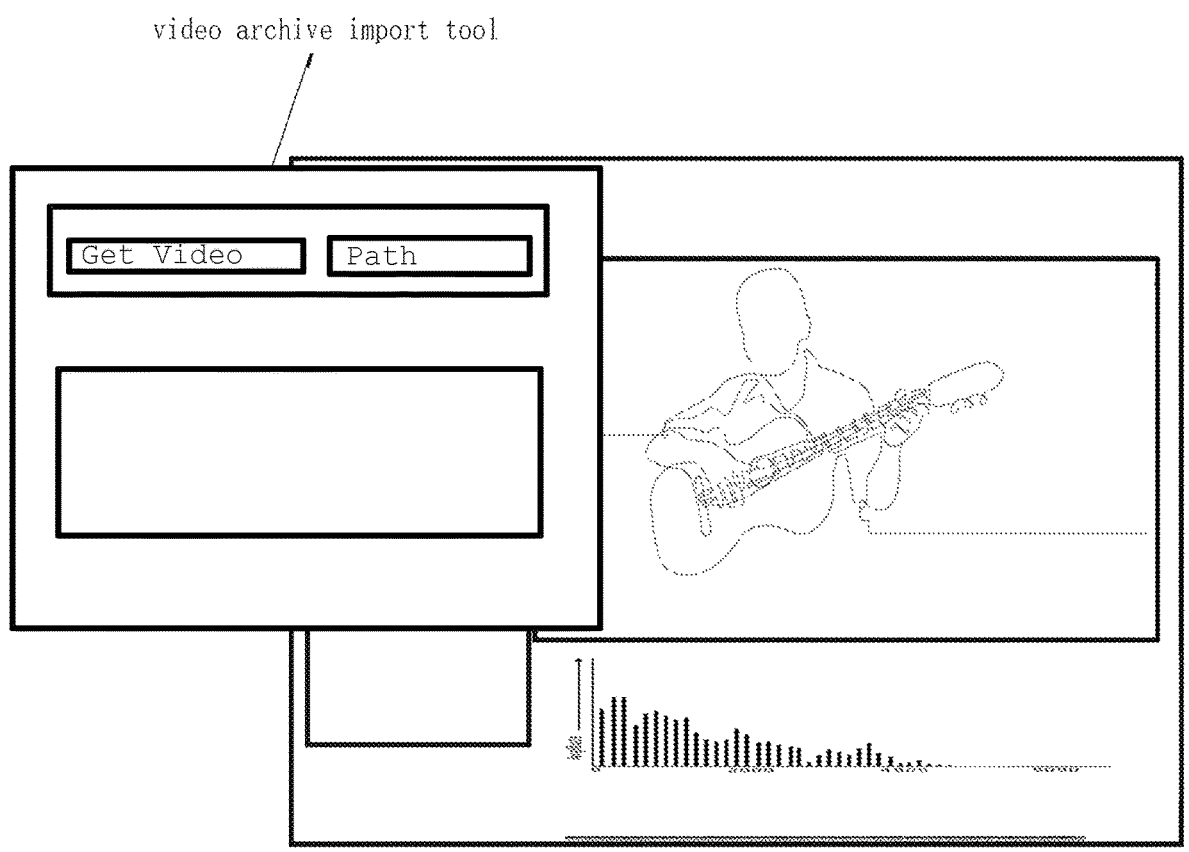
FIG. 3 illustrates a pop-up window showing a video archive import tool, according to an embodiment of the present invention.

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Referring to FIGS. 1 through 4, the system can be implemented via the remote computing gadget, and other devices, such as a self-learn music system, which will be described later. In some embodiments, the user may load a visual portion archive on to the remote computing gadget through any suitable process, such as importing the visual portion archive from an external source. Once the user has downloaded the visual portion archive to the remote computing gadget, the user can then open the visual portion archive within the system. Specifically, in order to process the visual portion archive, the visual portion archive can be initially selected from a local storage or database within the remote computing gadget via the user interface. As can be appreciated from the illustration in FIG. 2, by selecting the 'open' button under projects, the first user can be prompted to select the visual portion archive from the folder of the local database.

The system comprises a user interface for enabling a user (i.e., the first user) to interact therewith, and a processor, which comprises a set of computer instructions wherein, the processor and the user interface are disposed in operative communication with one another. The processor can be divided into a plurality of processing modules including a visual speed module, a repeating effect module, a magnifying module, and a self-learn music system module. The utility of each of which will become apparent from the following body of text.

The first user via the user interface can access the system over a communications network, such as, the Internet. The user interface can be facilitated by a plurality of remote user terminals, which may include a remote computing gadget (e.g. a desktop computer, a laptop computer, a tablet, a smartphone, and the like). For the system to be accessed, the system, which can be a computer application, can be initially installed within the remote computing gadget.

As well, the first user may import (e.g. download) the visual portion archive(s) from a visual portion hosting website. This can be performed by selecting a button (in the event of the visual portion hosting website) via the user interface. The selection results in an input URL field being opened. The first user can be prompted to enter the URL of the visual portion. Upon confirming the URL (by selecting a 'Close' button), the corresponding visual portion archive can be downloaded and saved to a local database of the remote computing gadget, while concurrently, the system can initiate processing of the selected visual portion archive.

Figure 4:
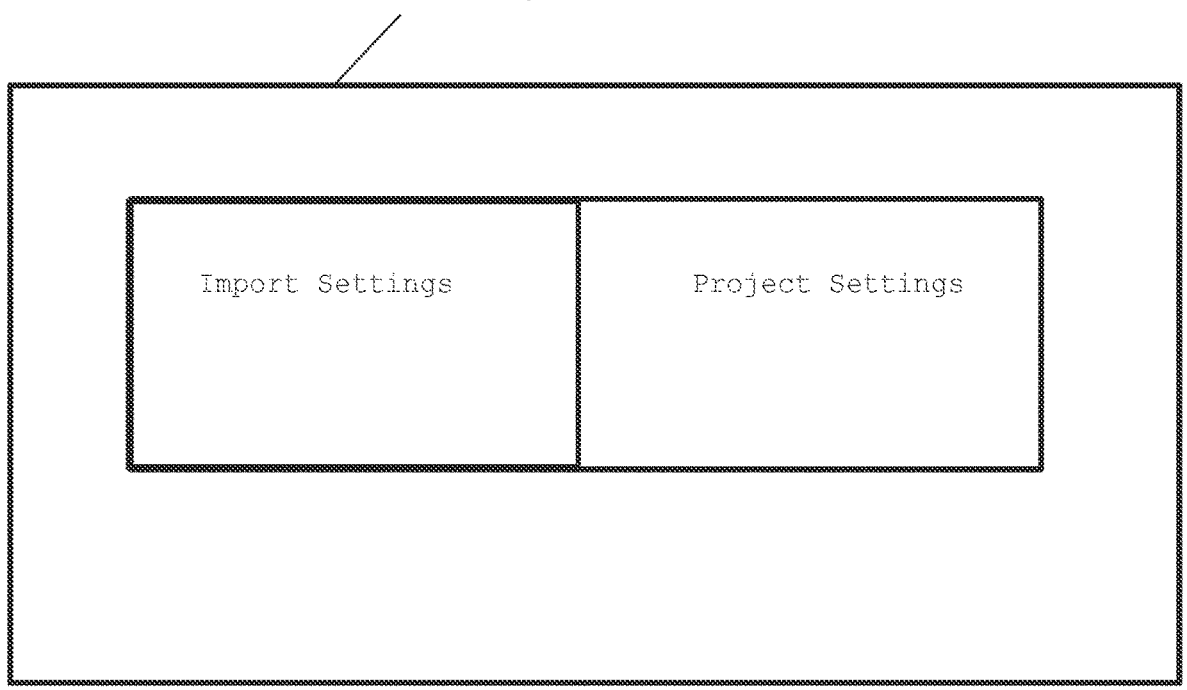
FIG. 4 illustrates an exemplary video archive import tool, according to an embodiment of the present invention.

In some embodiments, as can be appreciated from FIG. 4, the first user can be enabled to choose the quality of the sound portion and visual portion tracks of the visual portion being downloaded from a visual portion hosting website. More particularly, the first user can be enabled to choose between three qualities each for both sound portion and visual portion tracks. The three quality options for the visual portion track can include a high quality option, a medium quality option, and a low quality option. Similarly, the three quality options for the sound portion track can include a high quality option, a medium quality option, and a low quality option. It should be appreciated that the sound portion and visual portion track quality can be the quality as provided by the third party database. Once the respective track is imported, the quality level of the track can be processed to a level to optimize disk space. This process can make it easier to share the track with people who have lower bandwidth and/or slower Internet connections.

The method can further include creating a repeating effect, which can be initiated by assigning a start repeating effect point at any point along the length of the progress bar, assigning an end repeating effect point at any point along the length of the progress bar. The created repeating effect can thereby be displayed in the timeline to indicate to the user where the repeating effect occurs with respect to the rest of the song or project. Additionally, the method can include saving the repeating effect defined by the assigned start and end repeating effect points. The method can also include creating multiple repeating effects.

The disclosed system can further include a self-learn music system, which can be operated by a foot of the first user. In some embodiments, the self-learn music system device includes a rectangular stepped structure with a pair of first and second steps. Each step can include a row of four buttons, each of which can be dedicated to one or two functions depending on how the buttons are pressed. For example, pressing a button briefly may invoke a function while long-pressing a button may invoke a different function. In some embodiments, the first row can include a first button, a second button, a fifth button, and a sixth button. As well, the second row can include a third button, a fourth button, a seventh buttons, and an eighth button. More specifically, the fifth and sixth buttons can both be located between the first and second buttons. As well, the third and seventh buttons can both be located between the fourth and eighth buttons.

The first button can include a toggle button. Pressing the first button can result in the remote computing gadget playing a visual portion archive. As well, pressing the first button again can pause the visual portion archive from playing. Furthermore, pressing the second button can cause the visual speed of the visual portion archive to decrease while keeping the sound frequency of the musical music playing tool intact. Also, pressing the third button can assign a start repeating effect point and pressing the fourth button can assign an end repeating effect point where after, the first user can be prompted to save the repeating effect.

The self-learn music system module can include eight input fields. Each input field can represent a button on the self-learn music system, whereby each input field can be adapted to be assigned with a self-learn music system function. Pressing the respective self-learn music system button can correspond to the input field causing the processor to perform the function assigned to the corresponding input field. For example, if the first user has assigned play/pause function to the input field that corresponds to the seventh buttons, then pressing on the seventh buttons causes the visual portion to either pause or play. Embodiments of the present invention can also be directed to a computer-implemented method for assisting a first user in learning a musical sequence. Methods can include decreasing the visual speed of a synchronized sound portion-visual portion output of a visual portion archive such that, the sound portion remains in sound frequency.

What is claimed:

1. A method of instructing a first player to play a music playing tool to create a repeating effect displayed in a timeline at any point along a length of a progress bar via a screen of a remote computing gadget, comprising:

importing a visual portion archive into a folder of a remote computing gadget, wherein the visual portion archive comprises visual portion of a second player playing the music playing tool and sound portion of the second player playing the music playing tool, the first player resembling a student and second player resembling a teacher;

playing the visual portion archive with the remote computing gadget under a learning mode at regular speed, wherein decreasing speed at various visual speed of the visual portion, wherein:

decreasing visual speed at a first location of the visual portion, the first location relative to the displayed timeline along the length of the progress bar via the screen of the remote computing budget as instructed by the first player, a sound portion at a first location continues to remain in sound frequency; and decreasing visual speed at a second location of the visual portion, the first location relative to the displayed timeline along the length of the progress bar via the screen of the remote computing budget as instructed by the first player, a sound portion at a second location continues to remain in sound frequency;

playing the visual portion archive with the remote computing gadget under a practicing mode, wherein:

playing the visual portion archive at a first decreased visual speed at the first location of the visual portion without instructed by the first player, the sound portion at the first location continues to remain in sound frequency;

playing the visual portion archive at a second decreased visual speed at the second location of the visual portion without instructed by the first player, the sound portion at the first location continues to remain in sound frequency; and playing of the visual portion archive at all locations other than the first and second locations at the regular speed.

2. The method of claim 1, wherein the music playing tool is one of a stringed music playing tool, a brass music playing tool, a reed music playing tool, a keyboard music playing tool, and a percussion music playing tool.

3. The method of claim 1, wherein during the playing of the visual portion archive at all locations other than the first and second locations, the regular speed is increased.

4. The method of claim 1, wherein during the playing of the visual portion archive at all locations other than the first and second locations, the regular speed is decreased.

5. The method of claim 1, wherein during the playing of the visual portion archive at all locations other than the first and second locations, the regular speed is decreased to zero.

6. The method of claim 1, further magnifying and slow motioning into a selected area of the visual portion.

7. The method of claim 6, wherein the selected area is the second player playing the music playing tool magnifying away from the selected area of the visual portion.

8. The method of claim 7, further comprising:

creating a first repeating effect of a selected portion of the visual portion and sound portion; and adjusting at least one of a magnifying, a slow motion, and the visual speed functions of the first repeating effect.

9. The method of claim 8, further replaying the repeating effect.

10. The method of claim 9, further comprising:

creating a second repeating effect of a second selected portion of the visual portion and sound portion; and adjusting at least one of the magnifying, slow motion, and visual speed functions of the second repeating effect.

11. The method of claim 10, further comprising:

creating a third repeating effect of a third selected portion of the visual portion and sound portion;

creating a fourth repeating effect of a fourth selected portion of the visual portion and sound portion;

creating a fifth repeating effect of a fifth selected portion of the visual portion and sound portion;

creating a sixth repeating effect of a sixth selected portion of the visual portion and sound portion; and displaying, via a screen of the remote computing gadget, at least one repeating effect in a timeline that indicates duration of a song.

12. The method of claim 11, further comprising:

increasing the visual speed of the visual portion, magnifying and slow motioning into a selected area of the visual portion, creating a first repeating effect of a selected portion of the visual portion and sound portion; and adjusting at least one of a magnifying, a slow motion, and the visual speed functions of the first repeating effect.

13. The system of claim 1, wherein during the playing of the visual portion archive at all locations other than the first and second locations, the regular speed is increased.

14. The system of claim 1, wherein during the playing of the visual portion archive at all locations other than the first and second locations, the regular speed is decreased.

15. The system of claim 1, wherein during the playing of the visual portion archive at all locations other than the first and second locations, the regular speed is decreased to zero.

* * * * *